March 7, 1939.　　　U. V. D'ANNUNZIO　　　2,150,027
APPARATUS FOR PURIFYING AIR
Filed Oct. 30, 1937　　　4 Sheets-Sheet 4

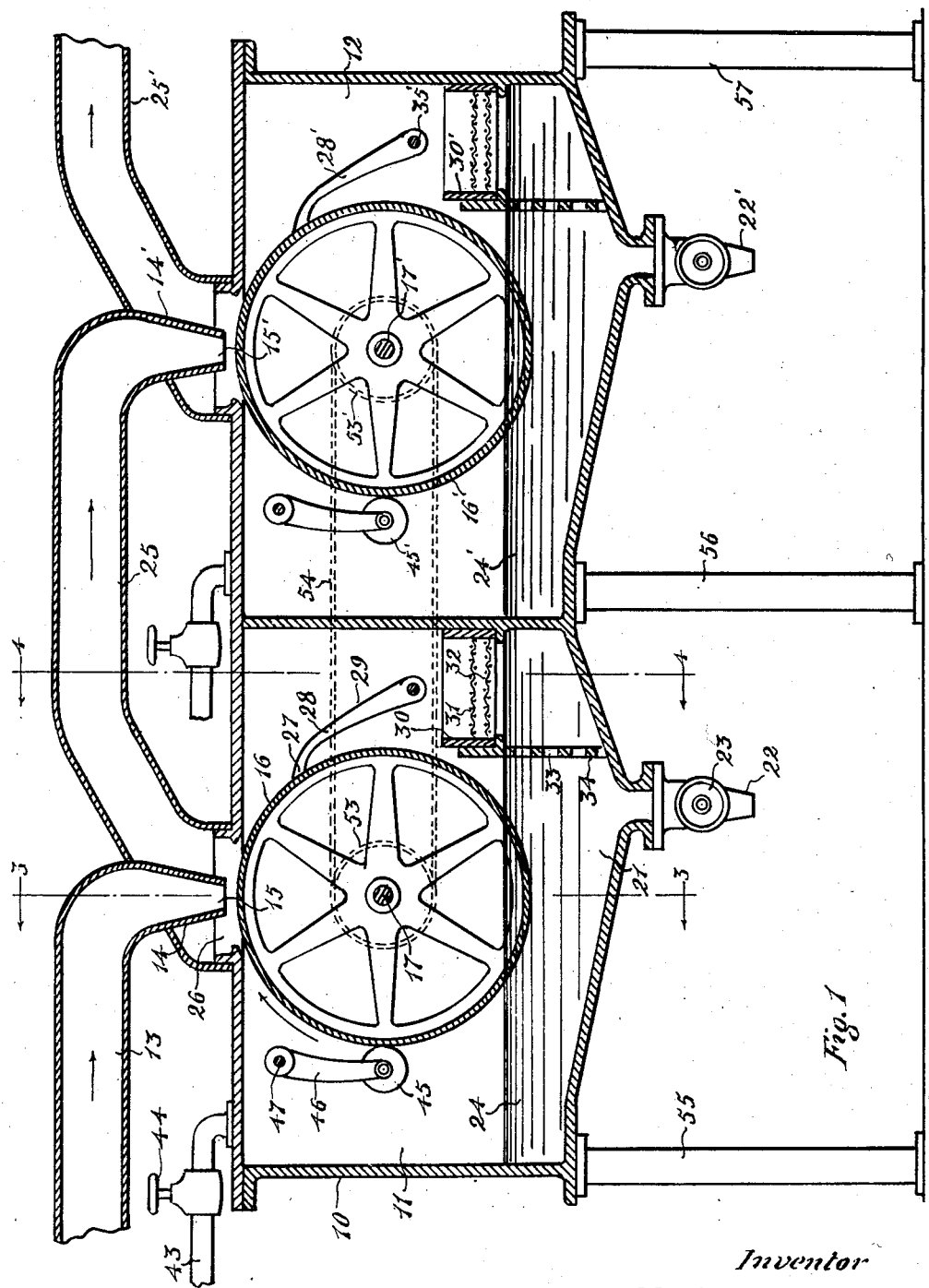

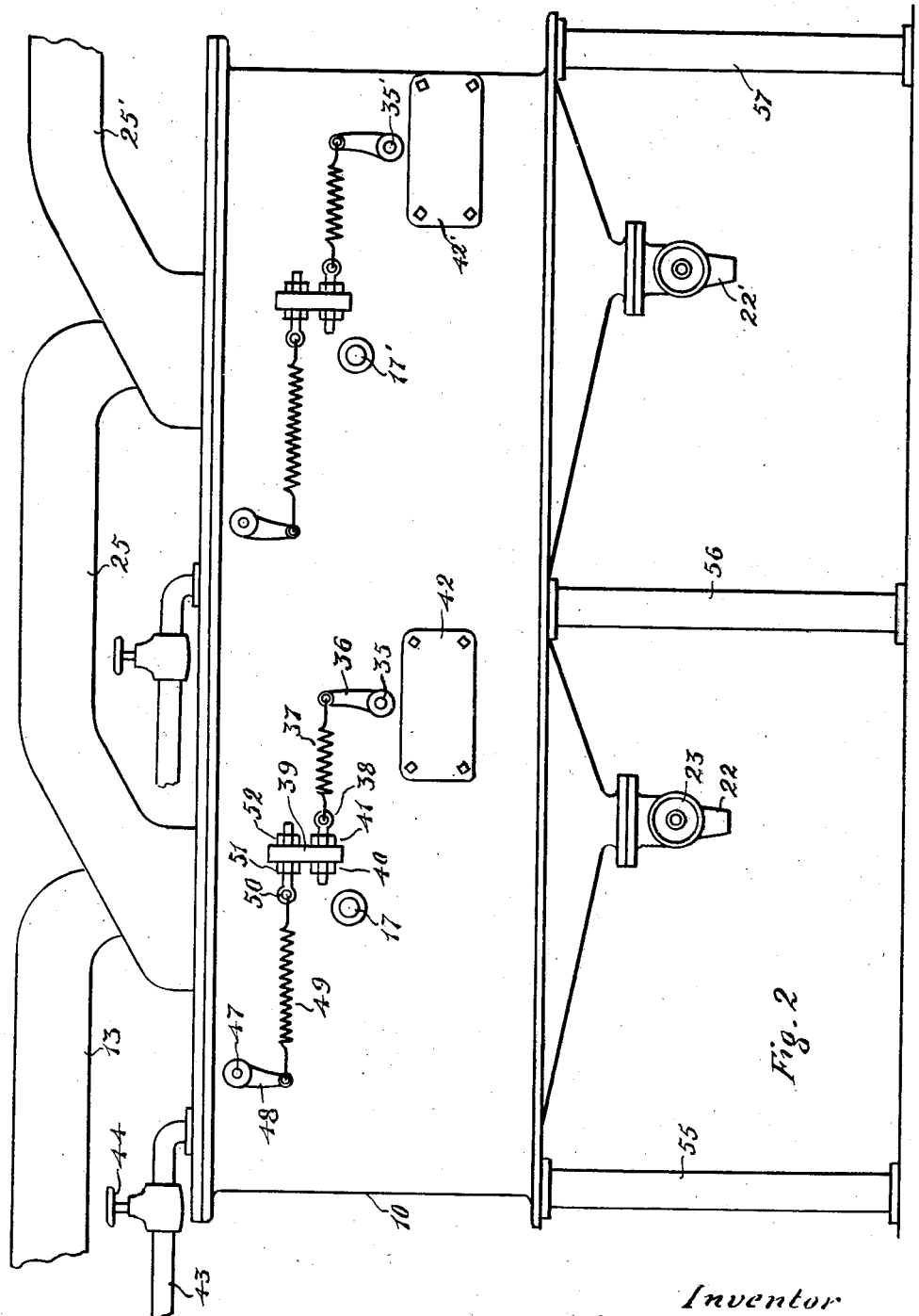

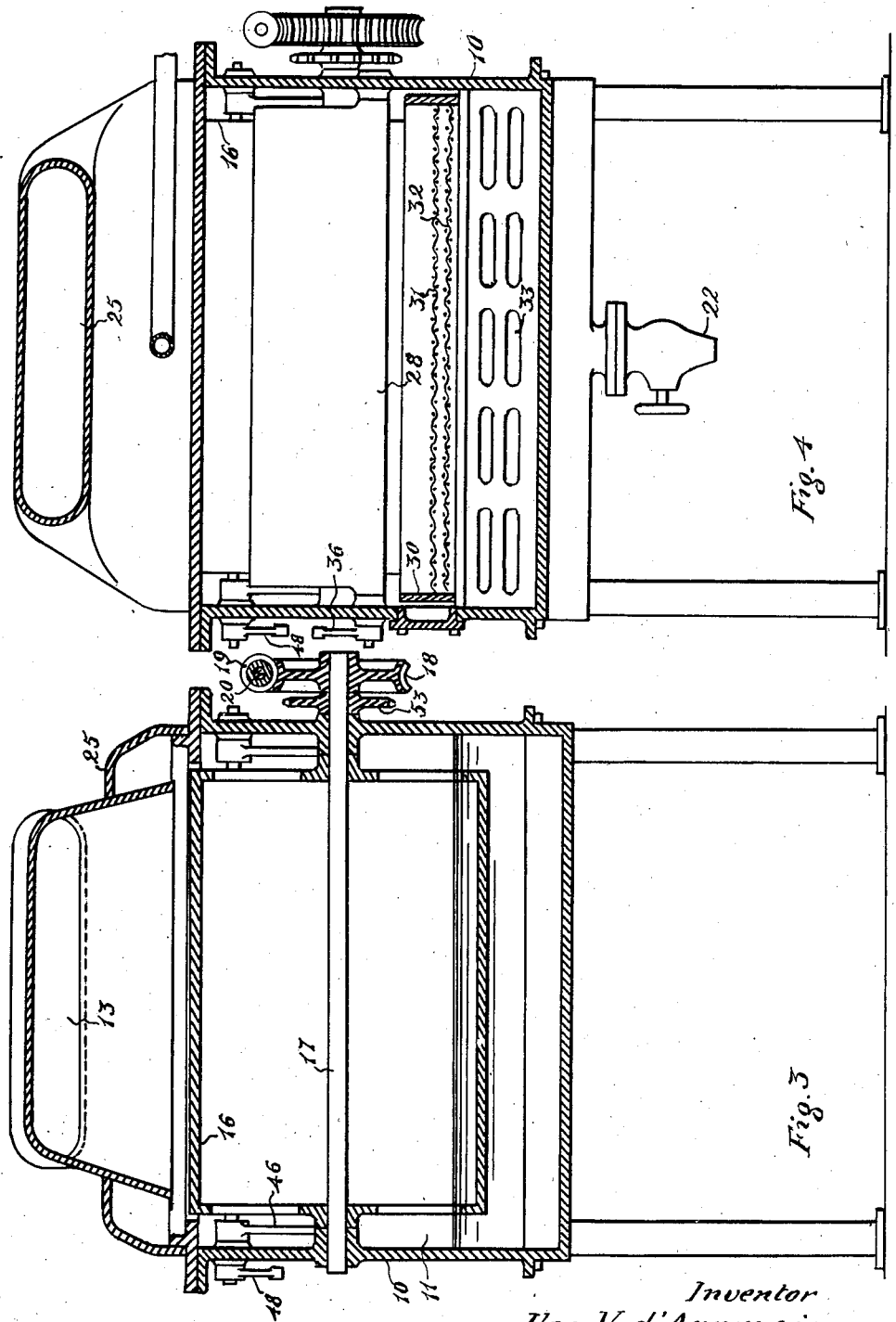

Inventor
Ugo V. d'Annunzio
by Guido M. Sacerdote
Attorney

Patented Mar. 7, 1939

2,150,027

UNITED STATES PATENT OFFICE 2,150,027

APPARATUS FOR PURIFYING AIR

Ugo V. d'Annunzio, New York, N. Y.

Application October 30, 1937, Serial No. 171,827

11 Claims. (Cl. 261—80)

This invention relates to the art of removing sand, dust, and other solid particles with which air or gas originating from certain sources is usually charged, and more particularly refers to improvements in apparatus for freeing a gas issuing from a pipe or duct at a certain velocity, from solid particles carried in suspension thereby.

There are in practice many instances where the removal of solid particles from air is necessary or desirable. For instance, in industrial plants the dust produced by the operation of polishing and grinding machines is usually carried away by air suction, the current of air being generated by a suction fan and the dust charged air being delivered to some point outside the building. The quantity of dust carried away by the air in such installations is quite considerable, and it is imperative that the air be freed from such dust before it is once more discharged into the surrounding atmosphere.

In some other cases it is necessary to free air from dust and other solid matter in order to prevent the abrasive action of such dust when the air is delivered to a delicate piece of machinery such as, for instance, an automotive engine in tractors and other appliances, which due to their conditions of service are likely to be operated in dusty surroundings.

Another instance where purification of the air is desirable, in fact essential, is in air conditioning installations where air should be delivered in a washed and filtered condition.

The collection of sand, dust and other solid matter suspended in air in motion constitutes a serious problem, especially when the quantity of solid matter suspended in the air is considerable and when the gritty action of even a small quantity of dust might seriously impair the life and performance of an expensive engine.

In large dust collecting installations the air is usually led to a chamber where its velocity is reduced so as to allow the major part of the solid matter suspended in the air to settle. This action is usually supplemented by that of filtering screens interposed in the path of the air and finally by discharging the partially purified air into or against the surface of some liquid to which the remaining dust particles will adhere.

However, in spite of these combinations of filtering and cleansing factors, it is rarely possible to entirely free the air from dust. The action of a liquid, especially a viscous liquid, is fairly effective so long as the surface of the liquid is clear. However, as more and more dust is retained by the liquid a film of solid matter will form upon the surface of the liquid, preventing direct contact between the liquid and the dust discharged thereagainst by the air, so that the dust removing action will practically cease.

When, instead of being discharged against the surface of the liquid, the air is discharged at a certain depth within the liquid, the resulting air bubbles will constitute so many air pockets which will prevent direct contact between the dust and the surrounding liquid, so that the air will usually rise from the surface of the liquid still charged with dust.

The primary object of this invention is to provide a novel and improved method of freeing air in motion from solid particles suspended therein, whereby the air will be purified in a continuous and efficient manner.

Another object is to provide a method for removing solid and semi-solid particles from air in motion whereby the air is caused to impinge against a surface covered with a film of suitable liquid, said surface being continuously renewed and being freed of the matter adhering thereto before it once more reaches the point where the air impinges thereagainst.

A further object is to provide a novel and improved air purifying apparatus, including means for presenting a moist surface directly opposite an outlet from which air to be purified is discharged, said moist surface being continuously renewed and the solid matter collecting thereon being continuously removed so as to permanently present a clean, efficient liquid film directly opposite the discharged air.

A still further object is to provide a novel and improved apparatus, consisting of relatively few parts, adapted to efficiently remove dust and other solid particles carried in suspension by a current of air or gas in a continuous manner.

Other objects and advantages of the present invention will more fully appear as the description proceeds and will be set forth and claimed in the appended claims.

My invention is illustrated by way of example in the accompanying drawings, in which:

Fig. 1 is a vertical longitudinal section of a dust collecting apparatus embodying my invention;

Fig. 2 is a front view in elevation of the same;

Fig. 3 is a vertical transversal section of the same through line 3—3 of Fig. 1;

Fig. 4 is a vertical transversal section of the same through line 4—4 of Fig. 1;

Figure 5:
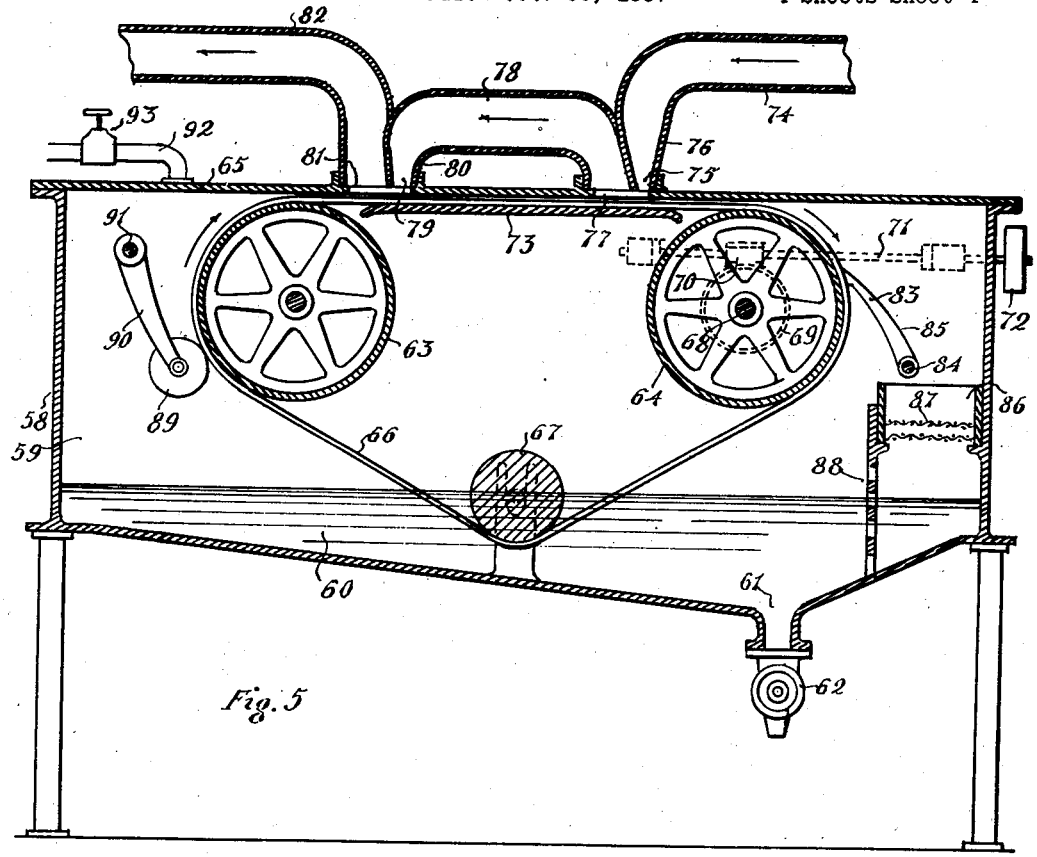
Fig. 5 is a vertical longitudinal section of another form of apparatus, also embodying my invention.

An apparatus embodying my invention comprises essentially an element having a traveling surface in close proximity of and directly opposite to an outlet or nozzle through which the air to be purified is supplied under pressure to the apparatus, means for continuously maintaining said traveling surface in a moist condition, means for freeing said surface of solid matter adhering thereto and means for delivering the purified air or gas to a point of discharge.

Referring to Figs. 1 to 4, which illustrate an apparatus such as might be used as part of a dust collecting system in an industrial plant, 10 designates a casing or frame formed with two separate chambers 11, 12, each forming a unit of the air purifying system.

The air or gas to be purified is supplied under pressure to the apparatus through a pipe 13, terminating in a nozzle 14, having its outlet 15 opening in proximity of and directly opposite the surface of a drum 16, rotatably mounted within chamber 11.

Said drum is carried by a shaft 17, running from front to rear through chamber 11, the rear end of said shaft carrying a wormwheel 18, which is driven by a worm 19, carried by a driving shaft 20. The rotation of driving shaft 20 will thus be transmitted to shaft 17 so as to cause shaft 17 and drum 16 carried thereby to rotate in a clockwise direction, as indicated by the arrow in Fig. 1.

The bottom of chamber 11 is preferably slanting to form a well 21, having a discharge outlet 22, controlled by a normally closed valve 23.

Chamber 11 is partially filled with a suitable liquid 24, within which the lower part of drum 16 is partly submerged. As a result the surface of drum 16 is continuously kept in a moist condition while the drum rotates within the liquid, so that the air discharged from the outlet 15 of nozzle 14 will directly impinge against a continuously renewed moist surface.

Due to the momentum imparted by the velocity of the air to the solid particles therein suspended, such solid particles will violently strike against the moist surface of the drum and will adhere to and be carried away by said surface. The air freed of the solid particles will rebound from the surface of the drum and will continue its course through a pipe 25 extending from opening 26 at the top of chamber 11.

As each point of the surface of the drum passes beyond outlet 15 of nozzle 14, it will eventually reach a point where the edge 27 of a scraper 28 bears against the surface of the drum and removes therefrom the film of liquid charged with solid matter, causing the same to run down its rear surface 29 and into a filtering box 30.

The bottom of said filtering box is provided with one or more filtering screens 31, 32, which will retain the solid matter, allowing the liquid to filter through and return to the well 21 through passages 33, provided in the wall 34 supporting the filtering box.

The scraper 28 is preferably in the form of a blade extending for the entire length of the drum, said blade being carried by a shaft 35 mounted in the front and rear walls of chamber 11 and provided at one of its projecting ends with an arm 36.

Said arm 36 provides a means of attaching thereto a tension spring 37, which is attached at its other end to eye-bolt 38 mounted in a lug 39 and adjustable by means of nuts 40, 41, in order to regulate the tension exerted by the spring and thus the pressure with which the scraper bears against the surface of the drum.

The filtering box should be removed from time to time for cleansing purposes, because the foreign matter accumulating upon the screen or screens will eventually impair its filtering capacity; therefore, the front wall of chamber 11 is preferably provided with an opening through which said filtering box can be inserted or removed, said opening being normally hermetically closed by means of a cover 42.

The liquid contained within chamber 11, which can be supplied thereto through a pipe 43, controlled by a valve 44, should possess such viscosity as may be best suited for the purpose. Water will do in most cases when the dust particles are very small, but when heavier particles may be carried in suspension by the air to be purified, or when the percentage of solid matter is relatively high, a liquid having a greater viscosity than that of water, such as, for instance, a mineral oil, is to be preferred.

While the character of the liquid used is a factor affecting the efficient operation of the device, the quantity of liquid adhering to the surface of the drum is also to be regulated so as to prevent an excessive quantity of liquid from adhering to the surface of the drum, such as might result in some of the liquid being atomized by the impinging air and carried away by said air through the discharge pipe.

I, therefore, prefer to provide means for removing from the surface of the drum any liquid which might adhere thereto in excess of that necessary and sufficient for absorbing the solid particles projected against it by the impinging air. This object can be attained by causing a roller 45 to bear against the surface of the drum at a point in advance of the air discharge outlet 15, said roller being mounted between a front and rear arm 46 carried by a shaft 47 running from front to rear through chamber 11.

At its front end said shaft 47 carries an arm 48 to the tip end of which is attached one end of a tension spring 49, the other end of which is attached to an eye-bolt 50 also mounted in lug 39, and adjustable by means of nuts 51, 52, to regulate the tension exerted by spring 49 and consequently the pressure with which roller 45 bears against the surface of the drum.

The assembly of the elements so far described in itself constitutes a complete apparatus for carrying my method into practice. However, where large quantities of air are to be treated, or where the air is charged with a high percentage of impurities, a single treatment may not be sufficient to remove all of the foreign matter from the air. In such cases, therefore, it may be desirable to subject the air to two or more successive treatments in order to finally deliver the air to the point of discharge in the desired degree of purity.

Therefore, the apparatus illustrated in Figs. 1 to 4 is shown as being composed of two units in series, the second unit being constituted by the chamber 12 and the other elements mounted within said chamber, said elements comprising drum 16', mounted on shaft 17', scraper 28' mounted on shaft 35', filtering box 30', and pressure roller 45' for removing the excess of liquid from the surface of the drum.

The air or gas discharged in a partly purified condition into pipe 25 is once more discharged at the other end of said pipe through a nozzle 14', having its outlet 15' opening in proximity of and directly opposite the surface of rotating drum 16', the lower part of said drum, like in the previous case, being submerged in the body of liquid 24'.

The air is finally discharged from chamber 12 through a discharge pipe 25'.

The treatment of the air or gas to be purified in successive steps not only offers the advantage of greater efficiency, but also makes it possible to use liquids of different viscosity in the successive steps. For instance, the liquid contained in chamber 11 may have a greater viscosity than that contained in chamber 12, so that the major part of the heavier particles may be retained by the surface of drum 16 and the air reaching chamber 12 will be charged with only some of the lighter particles, which can be best absorbed by a less viscous liquid.

Shaft 17' and other shafts carrying the drums of additional units, if any, can be driven by the first shaft 17 at the same or at different speeds, as the case may be. This can be done in any suitable manner, for instance, by providing shaft 17 with a sprocket 53, connected by a chain 54, to a similar sprocket 53' mounted on shaft 17'.

The discharge outlets 22, 22', of chambers 11, 12, are, of course, provided for drainage of the liquid from said chambers for filtering or renewal purposes. The apparatus is, therefore, mounted so as to be raised from the ground and is accordingly shown as being supported by columns 55, 56, 57, making it possible to leave a clearance under the outlets 22, 22' for the placement of tanks within which the liquids 24, 24' can be discharged. It is to be understood that the runways on which filtering boxes 30, 30' are supported and the openings served by covers 42, 42', are at a level above the level of the liquid within the chambers so that the removal of either cover will not affect the status of the liquid within the corresponding chamber.

In Fig. 5 I show an alternative form of apparatus also embodying my invention, in which the casing 58 forms a single chamber 59, partly filled with liquid 60, the bottom of said chamber being provided with an outlet 61, controlled by a valve 62, for the purpose of drainage.

Within the chamber are rotatably mounted two longitudinally spaced drums 63, 64, in proximity of the top 65 of the chamber. An endless belt 66 runs over said drums, said belt being long enough to extend downwardly from said drums into the body of liquid 60. The belt is maintained under sufficient tension to be driven by one of the drums 64 by an idle roller 67, resting with its weight upon the lower part of the belt.

The drum 64 is carried by a shaft 68, upon which is mounted a wormwheel 69, shown in dotted lines in Fig. 5, said wormwheel being mounted upon the shaft externally of the wall of the chamber and being driven by a worm 70, mounted on a shaft 71, having a driving pulley 72.

The upper portion of the belt extending between the two drums is preferably supported by a solid surface 73, forming a backing therefor, so as to enable the belt to function as a virtually rigid surface at the points where it is subjected to the impact of the current of air or gas.

Like in the previous case, the air or gas to be purified is supplied to the apparatus through a pipe 74 directing the air or gas to the outlet 75 of its nozzle portion 76, said outlet being in proximity of and directly opposite the surface of the traveling belt. The partly purified air or gas is then redirected through inlet 77 of an intermediate pipe 78 to the outlet 79 of its nozzle 80, said outlet also being in proximity of and directly opposite the surface of the traveling belt.

Said air or gas is here subjected to a second purifying treatment which will remove from said air or gas the residual solid particles which were not previously removed, the purified air or gas being finally discharged through inlet 81 of discharge pipe 82.

It will be observed that in all the arrangements illustrated the air or gas is discharged from the nozzle at right angles to the surface of the belt or drum so that it will impinge directly thereagainst. Furthermore, in order to make sure that part of the air or gas will not be deflected sidewise towards a laterally spaced outlet, without striking the moist surface with a full impact, the course of said air or gas is sharply reversed after it strikes the moist surface. In the arrangement shown this result is obtained not only by disposing the outlet for the air after it has been discharged by the nozzle against the moist surface, in proximity of and directly opposite the said surface, but also by disposing said outlet in close proximity of the nozzle's outlet, while preventing said air or gas from following any other than its predetermined directly reversed course.

Thus all of the air or gas must perforce strike the moist surface with the full impact due to its velocity so that the solid particles thereby carried will actually be projected against the moist surface and will surely come in contact with and be retained by the liquid film. Otherwise, if part of the air or gas were given a chance to follow a path laterally directed with respect to the nozzle in order to reach an outlet located at a distance therefrom, such a laterally deflected portion would not be freed of the major part of its impurities, only the film of such air or gas coming in actual contact with the moist surface being acted upon, and then not as efficiently as when the air or gas strikes said moist surface with the full impact due to its original direction of discharge.

As indicated in the drawings, the successive discharges of the air or gas against the belt preferably take place in reverse direction to that of the belt's travel. Due to the fact that drum 64 rotates in a clockwise direction, the upper or active portion of the belt will travel from left to right, so that it will pass first in front of the second discharge outlet 79 and then in front of the first discharge outlet 75.

By virtue of this arrangement the part of the belt which has freshly emerged from the body of liquid and is still free of solid matter is caused to perform the second or finishing step of the cleansing operation so that it will be in the best condition for removing the lighter dust particles still suspended in the air or gas at this stage. Since the residual quantity of solid matter still suspended in the air or gas at this stage is relatively small, the surface of the belt still remains in a sufficiently moist and receptive condition for subsequently retaining the major part of the solid matter contained in the air or gas discharged through the first outlet 75.

Like in the previous case, the surface of the belt is subsequently freed of the solid matter adhering thereto by means of a scraper 83 carried by a pivotal shaft 84, said scraper bearing against the belt at a preferably adjustable pressure induced in any suitable manner, for instance, by means of a spring, as explained in connection with scrapers 28, 28' of the apparatus previously described.

The matter thus removed from the surface of the belt will run down the back surface 85 of the scraper and into a filtering box 86, the bottom of which is formed by a filtering screen 87. Said filtering box is preferably removable endwise, as previously explained, for cleansing purposes and when in operation will redirect the filtered liquid to the bottom of chamber 59 through perforated wall 88. In this case also I prefer to provide suitable means for removing from the surface of the belt any excess liquid that should adhere thereto before said surface reaches the discharge nozzles. To this end I provide a roller 89, carried by arms 90, mounted on a pivotal shaft 91, said roller bearing with a preferably adjustable pressure against the surface of the belt at a point in advance of nozzle outlet 79, the pressure of said roller being exerted directly against that part of the belt which rides over drum 63.

Liquid may be supplied to chamber 59 through a supply pipe 92, controlled by a valve 93, or in any other suitable manner.

It is to be understood that also in this case the purifying steps may be more or less than two, according to the quantity and nature of the solid matter to be removed from the air or gas, and according to the degree of purity to be obtained in the air or gas when finally discharged.

In many instances the quantity of solid matter contained in the air or gas is relatively small and a single step of purification may be sufficient for the purpose. For instance, in the operation of an internal combustion engine the presence of any quantity of gritty particles, no matter how small, in the air supplied to the cylinders is highly objectionable. Therefore, although the percentage of solid matter is generally small its removal is highly desirable, a single purifying step being usually sufficient to thoroughly clean the air.

Figure 6:
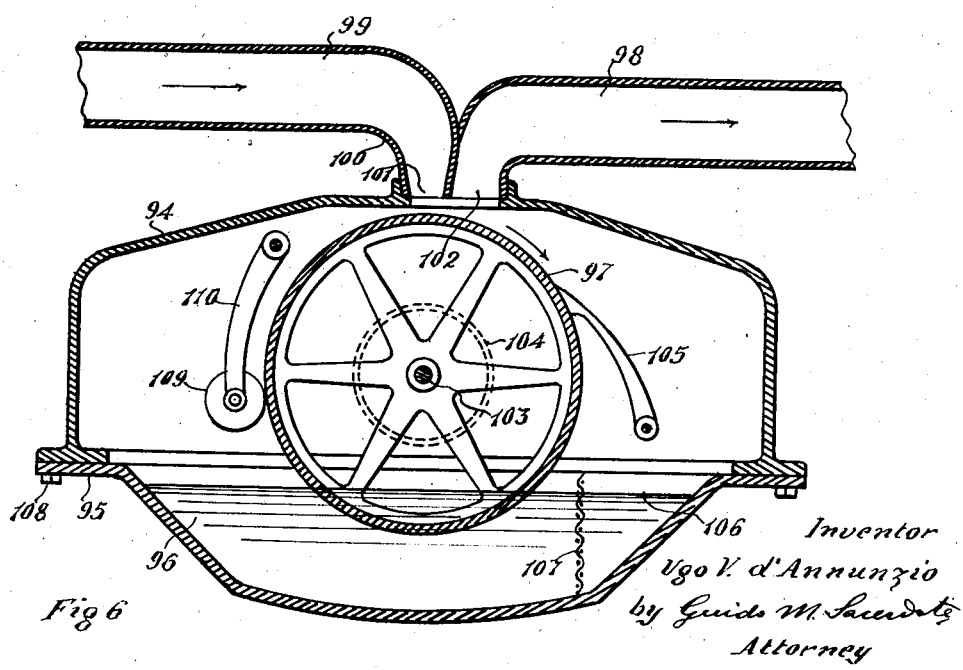
Fig. 6 is a vertical cross section of a device especially adapted for purifying the air supplied to an internal combustion engine.

A device suitable for use in connection with an explosion engine, such as may be used in a tractor, truck or airplane, is shown in Fig. 6. Such device is composed practically of the same elements as the apparatus previously described except that the device can be made reasonably small so as to permit of its being made a part of the equipment of the automotive device served thereby.

Referring to Fig. 6, it will be seen that the device comprises a casing 94, having a removable bottom part 95, forming a container for the body of liquid 96, within which is submerged the lower part of the rotating drum 97 mounted within said casing. The air sucked in by the engine through pipe 98 is supplied from the atmosphere through inlet pipe 99, terminating in a nozzle 100 having an outlet 101 opening in proximity of and directly opposite the surface of the drum 97.

After violently impinging against the surface of the drum the air is deflected through inlet 102 into pipe 98 leading to the carburetor and then to the engine. The rotation of drum 97 can be produced in any suitable manner, for instance, by operatively connecting its shaft 103 to some moving part of the engine through the gear 104, shown in dotted lines in the figure.

Also in this case the solid matter adhering to the surface of the drum is removed by a scraper 105, which will discharge the same into a compartment 106 of the receptacle formed by the bottom portion 95, said compartment being separated from the main part of the receptacle by a filtering screen 107. When the liquid within said receptacle is to be replaced by new liquid it is sufficient to remove and then replace the bottom 95, which is secured to the casing by means of screws 108.

Suitable means are also preferably provided for removing the excess liquid from the surface of the drum at some point in advance of the nozzle outlet, such means also in this case being represented by a roller 109, mounted between arms 110, said roller bearing at a preferably adjustable pressure against the surface of said drum.

The surface of the drum or other impurity collecting member can be moistened in ways other than by having its lower portion submerged in a liquid of the proper viscosity, so that in order to carry my invention into practice it is not absolutely necessary that said collecting member be mounted on a horizontal shaft, or shafts.

In some installations where air may be directly discharged into the atmosphere after having been freed of the solid or semi-solid particles therein suspended, it is also possible to omit the use of a discharge conduit for the purified air, such as shown at 25' in Fig. 1, the air being discharged directly through the opening in the casing.

The inventive idea may in other respects be applied in ways different from those shown in the drawings; said drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, means for maintaining said surface in a moist condition adapted to retain particles carried by said gas impinging against the same, and a discharge conduit for the purified gas deflected by said surface, the inlet of said conduit facing said surface at a point in close proximity of the outlet of said nozzle.

2. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, means for maintaining said surface in a moist condition adapted to retain particles carried by said gas impinging against the same, means for removing said particles from said surface directly as they are collected thereon, and a discharge conduit for the purified gas deflected by said surface, the inlet of said conduit facing said surface at a point in close proximity of the outlet of said nozzle.

3. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, a body of liquid at the bottom of said casing reaching a level sufficient to submerge the lower portion of said surface, means for removing from said surface the liquid film and particles adhering thereto, directly as said particles are collected upon said surface, and means for separating the liquid from the particles, and for redirecting the liquid to the body thereof at the bottom of the casing.

4. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, a body of liquid at the bottom of said casing reaching a level sufficient to submerge the lower portion of said surface, means for removing from said surface the liquid film and particles adhering thereto, directly as said particles are collected upon said surface, means for separating the liquid from the particles, and for redirecting the liquid to the body thereof at the bottom of the casing, and a discharge conduit for the purified gas deflected by said surface.

5. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, a body of liquid at the bottom of said casing reaching a level sufficient to submerge the lower portion of said surface, means for removing from said surface the liquid film and particles adhering thereto, directly as said particles are collected upon said surface, means for separating the liquid from the particles, and for redirecting the liquid to the body thereof at the bottom of the casing, and means for removing the excess liquid from said surface at a point in advance of said nozzle.

6. Apparatus for freeing a gas from small particles therein suspended, comprising a casing, an impurity collecting member having an endless surface, mounted within said casing, a nozzle for discharging said gas at a certain velocity directly against said surface, means for actuating said member so as to cause said surface to continuously travel in a given direction, a body of liquid at the bottom of said casing reaching a level sufficient to submerge the lower portion of said surface, means for removing from said surface the liquid film and particles adhering thereto, directly as said particles are collected upon said surface, and a removable filtering box for separating the liquid from the particles, and for redirecting the liquid to the body thereof at the bottom of the casing.

7. Apparatus for freeing a gas from small particles therein suspended, comprising a casing having a plurality of chambers, a drum rotatably mounted within each chamber, a nozzle for discharging said gas at a certain velocity directly against the surface of each drum, a body of liquid at the bottom of each chamber reaching a level sufficient to submerge the lower portion of the corresponding drum, means for removing from the surface of each drum the liquid film and particles adhering thereto, means for separating the liquid from the particles and for redirecting the liquid to the body thereof at the bottom of the corresponding chamber, a discharge conduit for the purified gas deflected by the surface of each drum but the last, leading said gas to the nozzle facing the next drum, and a discharge conduit for the purified gas deflected by the surface of the last drum.

8. Apparatus for freeing a gas from small particles therein suspended, comprising a casing having a plurality of openings, an impurity collecting member having an endless surface, mounted within said casing so that its surface virtually closes said openings, means for maintaining said surface in a moist condition, a nozzle for discharging said gas at a certain velocity through each opening directly against said surface, a conduit for discharging through each opening the gas deflected by said surface, said nozzle and conduit together enclosing the mouth of each opening and forming with the portion of said surface exposed through said opening a virtually closed flow reversing channel for said gas, the discharge conduit for the gas deflected by said surface through each opening but the last leading to the nozzle serving the next opening, the discharge conduit from the last opening leading the purified gas to a point of delivery, and means for actuating said member so as to cause said surface to continuously travel in a given direction.

9. Apparatus for freeing a gas from small particles therein suspended, comprising a casing having a plurality of openings, an impurity collecting member having an endless surface, mounted within said casing so that its surface virtualy closes said openings, means for maintaining said surface in a moist condition, a nozzle for discharging said gas at a certain velocity through said opening directly against said surface, a conduit for discharging through each opening the gas deflected by said surface, said nozzle and conduit together enclosing the mouth of each opening and forming with the portion of said surface exposed through said opening a virtually closed flow reversing channel for said gas, the discharge conduit for the gas deflected by said surface through each opening but the last leading to the nozzle serving the next opening, the discharge conduit from the last opening leading the purified gas to a point of delivery, and means for actuating said member so as to cause said surface to continuously travel in a given direction, said nozzles and discharge conduits forming a step by step passage for said gas from the first to the last opening and causing said gas to travel in a direction opposite to that of the travel of said surface.

10. Apparatus for freeing a gas from small particles therein suspended, comprising a casing having a plurality of openings, an impurity collecting member having an endless surface, mounted within said casing so that its surface virtually closes said openings, means for maintaining said surface in a moist condition, a nozzle for discharging said gas at a certain velocity through said opening directly against said surface, a conduit for discharging through each opening the gas deflected by said surface, said nozzle and conduit together enclosing the mouth of each opening and forming with the portion of said surface exposed through said opening a virtually closed flow reversing channel for said gas, the discharge conduit for the gas deflected by said surface through each opening but the last leading to the nozzle serving the next opening, the discharge conduit from the last opening leading the purified gas to a point of delivery, means for actuating said member so as to cause said surface to continuously travel in a given direction, and means for removing from said surface the liquid film and particles adhering thereto, as said particles are collected upon said surface.

11. Apparatus for freeing a gas from small particles therein suspended, comprising a nozzle for discharging said gas under pressure, a discharge conduit for said gas having its inlet in close proximity to the outlet of said nozzle, an impurity collecting member having an endless surface directly opposite said inlet and outlet and forming a closure for the space within which said inlet and outlet open, means for actuating said member so as to cause said surface to continuously travel in a given direction, and means for maintaining said surface in a moist condition adapted to retain particles carried by said gas impinging against the same.

UGO V. D'ANNUNZIO.